(12) United States Patent
Francis

(10) Patent No.: US 8,121,225 B1
(45) Date of Patent: Feb. 21, 2012

(54) ESTIMATING THE ANGLE OF ARRIVAL OF A SIGNAL RECEIVED BY AN ARRAY OF COMMUTATED ANTENNA ELEMENTS

(75) Inventor: James Covosso Francis, Fairport, NY (US)

(73) Assignee: L-3 Services, Inc., San Diego, CA (US)

( * ) Notice: Subject to any disclaimer, the term of this patent is extended or adjusted under 35 U.S.C. 154(b) by 833 days.

(21) Appl. No.: 12/214,999

(22) Filed: Jun. 24, 2008

(51) Int. Cl.
*H04L 27/06* (2006.01)
*H03D 1/00* (2006.01)

(52) U.S. Cl. ........ 375/341; 375/346; 375/340; 375/285; 375/262; 342/378; 342/429

(58) Field of Classification Search .................. 375/341, 375/346, 340, 285, 262; 342/378, 429
See application file for complete search history.

(56) References Cited

U.S. PATENT DOCUMENTS 5,323,167 A * 6/1994 Peavey et al. ................. 342/429
6,600,447 B1 * 7/2003 Molnar ......................... 342/378

* cited by examiner

*Primary Examiner* — Phuong Phu
(74) *Attorney, Agent, or Firm* — Edward W. Callan

(57) ABSTRACT

The angle of arrival is estimated for a received signal received by an array of commutated antenna elements, wherein there is a temporal boundary at the instant of commutation between antenna elements. Samples of the signal received by the elements of the array are preprocessed to construct maximum-likelihood-estimates of the received signal for points in time that are immediately adjacent the temporal boundaries and thereby provide a preprocessed signal. A maximum-likelihood-estimation of the angle of arrival of the received signal is made for the array of commutated antenna elements by processing the preprocessed signal.

19 Claims, 4 Drawing Sheets

```
In[1]:= plot$power$spectrum[x_, range_, fs_] := Module[{xx, mag2xx},
    xx = Fourier[PadRight[x, 1024], FourierParameters -> {1, -1}];
    mag2xx = 10 Log[10, Abs[xx] / Max[Abs[xx]]];
    mag2xx = MapThread[
       {Mod[#1 fs / Length[mag2xx], fs, -fs / 2], #2} &, {Range[Length[mag2xx]] - 1, mag2xx}];
    ListPlot[mag2xx, Joined -> True, PlotRange -> range]
    ]

(*Yields the impulse response of a filter x*)
   (*ListConvolve[x,{1},{1,-1},0]*)

fs = 192000;
   howmanydwells = 24;
   sizedwell = 48;
   (*nz zeros at the beginning and nz zeros at the end*)
   nz = 4;

In[6]:= i2z = (+Range[nz])~Join~(-Range[nz]);
   (*Debug Only*)
   (*
   i2z={};
   *)

In[7]:= basis[βn_] := Table[Sinc[π (n - 3 βn) / βn] (0.53836 - 0.46164 Cos[π n / (3 βn)]), {n, 0, 2×3 βn}];

h = basis[Round[fs / 3000]];

SeedRandom[12345]
   x = RandomReal[NormalDistribution[0, 1], Length[h] + howmanydwells sizedwell] +
       i RandomReal[NormalDistribution[0, 1], Length[h] + howmanydwells sizedwell];
   y = ListConvolve[h, x, {1, -1}, 0];
   y = Drop[y, Length[h]];
   y /= Max[Abs[y]];

yp = Partition[y, sizedwell];
   y = Flatten[((3 / 4 e^(i 90 °))^(Range[yp // Length] - 1) yp];

y2 = Take[y, 2 sizedwell];

yp = Partition[Take[y, howmanydwells sizedwell], sizedwell];
   yp[[All, i2z]] = 0;

In[19]:= sb$setup[β_] := Module[{βn, x, i, n, δ},
    βn = Round[fs / β];
    x = basis[βn];
    i = Range[2×2×3 + Ceiling[2 sizedwell / βn]];
    aa = Take[Drop[RotateRight[PadRight[x, Length[x] + Last[i] βn], # βn], 2×3 βn] & /@ i^T,
       2 sizedwell]^T;
    aa = Select[aa, Norm[#]^2 > 0 &]^T;

aal = Take[aa, +sizedwell];
    aar = Take[aa, -sizedwell];
    aazl = aal;
    aazl[[i2z, All]] = 0;
    aazr = aar;
```

FIG. 3A

```
    aazr[[i2z, All]] = 0;
    aaz = aazl ~ Join ~ aazr;

(*More tables*)
    n = 8; (*2n+1 matrices*)
    rmax = 4;
    δ = (rmax^2)^(1/(2 n));
    wwall = (
        ww = Inverse[CholeskyDecomposition[aazl'.aazl + #^2 aazr'.aazr]]';
        {#, ww}
        ) & /@ (δ^Range[-n, +n] // N);
]

sb$preprocess[y2_] := Module[{y2l, y2r, u1, u2, μ, i, xl, xc, xr,
    yl, yc, yr, a, b, c, r, bb, ll, uu, d, flsl, flsu, z1, z2, θ, u, x, y, x0},
    y2l = Take[y2, +sizedwell];
    y2r = Take[y2, -sizedwell];
    u1 = aazl'.y2l;
    u2 = aazr'.y2r;

μ = (
        {r, ww} = #;
        z1 = ww.u1;
        z2 = ww.u2;
        {r, Norm[z1]^2 + r 2 Abs[Conjugate[z1].z2] + r^2 Norm[z2]^2}
        ) & /@ wwall;
    i = First[Ordering[μ[[All, 2]], -1]];
    If[i == 1, ++i];
    If[i == Length[μ], --i];
    {xl, yl} = μ[[i - 1]];
    {xc, yc} = μ[[i]];
    {xr, yr} = μ[[i + 1]];
    (*3x3; Use Cramer's rule*)
    {a, b, c} = LinearSolve[{#^2, #, 1} & /@ {xl, xc, xr}, {yl, yc, yr}];
    r = -b / (2 a);
    If[r > rmax, r = rmax];
    If[r < 1 / rmax, r = 1 / rmax];

bb = aazl'.aazl + r^2 aazr'.aazr;
    (*Use LU decomposition; B=LU*)
    (*The 110B has code for this*)
    ll = CholeskyDecomposition[bb]';
    uu = ll';
    d = Diagonal[ll];
    ll = ll.DiagonalMatrix[1 / d];
    uu = DiagonalMatrix[d].uu;
    (*L has 1's on the main diagonal*)

(*The LinearSolve is using lower and upper triangular systems of equations only*)
    flsl = LinearSolve[ll];
    flsu = LinearSolve[uu];
    z1 = flsl[u1];
    z2 = r flsl[u2];
    θ = Arg[Conjugate[z1].(z2 / Diagonal[uu])];
```

FIG. 3B

```
        u = u1 + r e^(-i θ) u2;
        x = f1su[f1s1[u]];
        y = (aa1.x) ~Join~ ((r e^(i θ)) (aar.x));
        x0 = Mean[y[[{0, 1} + sizedwell]]];
        x0 {1, r e^(i θ)}
      ]
```

In[21]:= β = 6000;
sb$setup[β];

```
y2 = yp[[6]] ~Join~ yp[[6 + 1]];
ListPlot[{y2 // Re, y2 // Im}]

z2LR = sb$preprocess[y2];

Arg[Last[z2LR] Conjugate[First[z2LR]]] / °
{y[[sizedwell]], Last[z2LR] / First[z2LR] y[[sizedwell + 1]]}
{y2[[sizedwell]], y2[[sizedwell + 1]]}
```

Out[24]= *(plot)*

Out[26]= 90.1746

Out[27]= {-0.773777 - 0.53739 i, 0.441078 + 0.31841 i}

Out[28]= {0, 0}

In[29]:= y2 = yp[[6]] ~Join~ yp[[6 + 1]];
(z2LR = sb$preprocess[y2]; Arg[Last[z2LR] / First[z2LR]] / °)

Out[30]= 90.1746

In[31]:= results = MapThread[(z2LR = sb$preprocess[#1 ~Join~ #2]; Arg[Last[z2LR] / First[z2LR]] / °) &,
        {Drop[yp, -1], Drop[yp, +1]}]
Mean[results]
StandardDeviation[results]

Out[31]= {90.0178, 89.9761, 89.8819, 90.0635, 90.0948, 90.1746, 89.9806,
         89.7792, 89.6807, 89.8746, 90.1321, 89.9952, 89.7972, 90.0267, 90.6072,
         90.1097, 90.0925, 89.9607, 89.9732, 89.3053, 89.9661, 89.9853, 89.9046}

Out[32]= 89.973

Out[33]= 0.228863

FIG. 3C

ESTIMATING THE ANGLE OF ARRIVAL OF A SIGNAL RECEIVED BY AN ARRAY OF COMMUTATED ANTENNA ELEMENTS

BACKGROUND OF THE INVENTION

The present invention generally pertains to estimating the angle of arrival (AOA) of a received signal and is particularly directed to estimating the AOA of a signal received by an array of commutated antenna elements.

Arrays of antenna elements are commonly used for estimating the AOA of a received signal. For tactical signal-intercept applications it is desirable for the signal-intercept hardware to be of minimal size, weight, and power (SWAP). To realize minimal SWAP it is desirable to use a single tuner and to commutate the antenna elements of the array. However, because there is a temporal boundary at the instant of commutation between antenna elements, commutation of the antenna elements results in problems that do not occur with a non-commutated array.

A sampled received signal is a complex signal having a modulus (amplitude) and an argument (angle). Consider a small interval around the boundary of commutation between two antenna elements of an array of antenna elements, and suppose that this interval is much smaller than the reciprocal of the bandwidth of the received signal. Bandwidth determines rate of change. Therefore in close proximity to the boundary the received signal is approximately constant. At the boundary of commutation there is a change related to the AOA of the sampled complex received signal. Theoretically, the AOA affects both the modulus and the argument of a sample of a complex signal received by a low-band antenna, but only the argument of a complex signal received by mid and high-band antennas. At an instant in time that is before or after the boundary by an interval that is on the order of the reciprocal of the bandwidth of the received signal, the received signal itself may change as a result of modulation, and thereby affect the complex signal samples of the received signal.

The AOA may be derived from a received signal sampled immediately adjacent to the boundary (i.e. before and after). The sampled received signal is degraded by noise that is both inside and outside the bandwidth of the received signal; whereby optimal noise performance necessitates rejecting the noise that is outside the bandwidth of the received signal. Ordinarily, such rejection may be accomplished with a simple low-pass filter, provided that the frequency offset is minimal. However, any filter has a transient and this transient will be exhibited at each boundary of commutation. Superficially, it may seem that one need only move away from the boundary to avoid this transient; but moving the sampling of the received signal away from the boundary by the reciprocal of the bandwidth of the received signal permits the modulation aspect of the received signal to affect the observed change in the sampled received signal across the boundary. Thus it is not preferable to merely filter per se. One method that has been used is to filter the sampled received signal with a low-pass filter having a bandwidth larger than the received signal. This approach does not attain optimal noise performance as it does not suppress some noise that is outside the bandwidth of the received signal.

There is also a further problem. At the boundary of commutation there is an interval of time during which electrical switching between the antenna elements occurs, whereupon the resulting samples of the received signal during this interval are unusable. A common method for addressing this further problem is to zero the samples of the received signal observed during this switching interval. This method is incorrect and results in distortion.

In statistical signal processing the problem of estimating the AOA is a parameter estimation problem. As a simple example of a parameter estimation problem, suppose one is given $x_1=A+v_1$ and $x_2=A+v_2$ where $v_1$ and $v_2$ are random variables, and the objective is to estimate A from $x_1$ and $x_2$. Furthermore, assume that $v_1$ and $v_2$ are independent and identically distributed (i.i.d.) and zero mean. Consider now two different estimates of A, $\alpha=x_1$ and $$\beta = \frac{x_1 + x_2}{2}.$$

The expected value of both of these estimates is A, but the variance of $\alpha$ is twice as large as the variance of $\beta$. In other words when there is no noise both of these estimates will be correct, but as noise is introduced $\beta$ is more likely to be closer to A. It seems that all too often it is the case that an estimate is chosen by manipulating equations that apply in the absence of noise. In the example, this might go something like this. Without noise $v_1=0$ and $v_2=0$, and therefore $x_1=A$ and $x_2=A$. Let's use $\alpha=x_1$ as $x_1=A$. This works when there is no noise but $$\beta = \frac{x_1 + x_2}{2}$$

is the superior choice.

Estimation of the AOA is complicated by the fact that it is not possible to estimate the AOA without also estimating the received signal. In other words, there are multiple parameters that must be simultaneously estimated. Many received signals have bandwidths that exceed 100 kHz; and the maximum commutation rate is less than 100 k commutations/second. Thus, commutation boundaries may be separated by more than the reciprocal of the bandwidth of the received signal. With a succession of boundaries the sample of the received signal changes not only with the AOA but also with the modulation of the target signal portion of the received signal.

One method of AOA estimation that has been used previously is to compute the ratio of the observed received signal samples on each side of a boundary. FM discrimination across the boundary is a simple and equivalent alternative method for obtaining the same result. The intuitive appeal of this alternative method is that the result is independent of the modulation of the target signal. (The observed samples of the received signal before and after the boundary are assumed to be the same, whereby they cancel each other in the ratio.) Unfortunately, this alternative method falls into the category of computing the estimate without considering performance in noise, and this alternative method is without rigorous statistical foundation. Additionally, this alternative method also succumbs to problems of suboptimal noise performance and distortion.

SUMMARY OF THE INVENTION

The present invention provides a method of estimating the angle of arrival of a signal received by an array of commutated antenna elements, wherein there is a temporal boundary at the instant of commutation between antenna elements, comprising the steps of:

(a) preprocessing samples of a signal received by an array of commutated antenna elements to construct estimates of the received signal for points in time that are immediately adjacent the temporal boundaries and thereby provide a preprocessed signal; and (b) estimating the angle of arrival of the received signal by processing the preprocessed signal.

The present invention also provides a method of preprocessing a signal received by an array of commutated antenna elements, wherein there is a temporal boundary at the instant of commutation between antenna elements, comprising the steps of:

(a) providing samples of a signal received by an array of commutated antenna elements; and (b) preprocessing the provided samples of the received signal to construct estimates of the received signal for points in time that are immediately adjacent the temporal boundaries and thereby provide a preprocessed signal.

The present invention further provides a method of estimating the signal-to-noise ratio of a signal received by an array of commutated antenna elements, wherein there is a temporal boundary at the instant of commutation between antenna elements, comprising the steps of:

(a) preprocessing samples of a signal received by an array of commutated antenna elements to construct estimates of the received signal for points in time that are immediately adjacent the temporal boundaries and thereby provide a preprocessed signal;

(b) estimating the angle of arrival of the received signal for the array of commutated antenna elements by processing the preprocessed signal to make a maximum-likelihood-estimation of the angle of arrival of the received signal; and (c) using a residual error associated with the maximum-likelihood-estimation of the angle of arrival of the received signal to estimate the signal-to-noise ratio of the received signal.

The present invention additionally provides systems for performing the respective above-described methods and computer readable storage media including computer executable program instructions for causing one or more computers to perform and/or enable the steps of the respective above-described methods.

Additional features of the present invention are described with reference to the detailed description.

BRIEF DESCRIPTION OF THE DRAWING

FIGS. 3A, 3B and 3C disclose an example of source code for a computation performed in one embodiment of the preprocessing step shown in FIG. 2.

DETAILED DESCRIPTION

Figure 1:
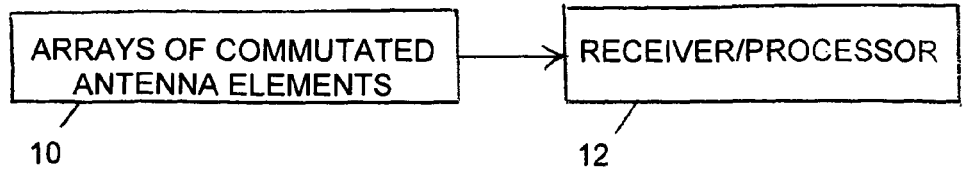
FIG. 1 is a block diagram of an exemplary system in which the methods of the present invention are performed.

Referring to FIG. 1, an exemplary system in which the methods of the present invention are performed includes a plurality of arrays of commutated antenna elements 10 and a signal receiver/processor 12. In a preferred embodiment there are separate arrays of antenna elements for low-band, mid-band, and high-band reception respectively. The low-band array includes a whip antenna element and a loop antenna element. The mid and high-band arrays are phased uniform circular arrays and differ in the number of elements.

The receiver/processor 12 includes a computer. The computer contains computer readable storage media that includes computer executable program instructions for causing the computer to perform and/or enable the various processing steps that are described herein. These instructions are stored in the computer readable storage media of the computer when the computer is manufactured and/or upon being downloaded via the Internet or from a portable computer readable storage media containing such instructions.

Figure 2:
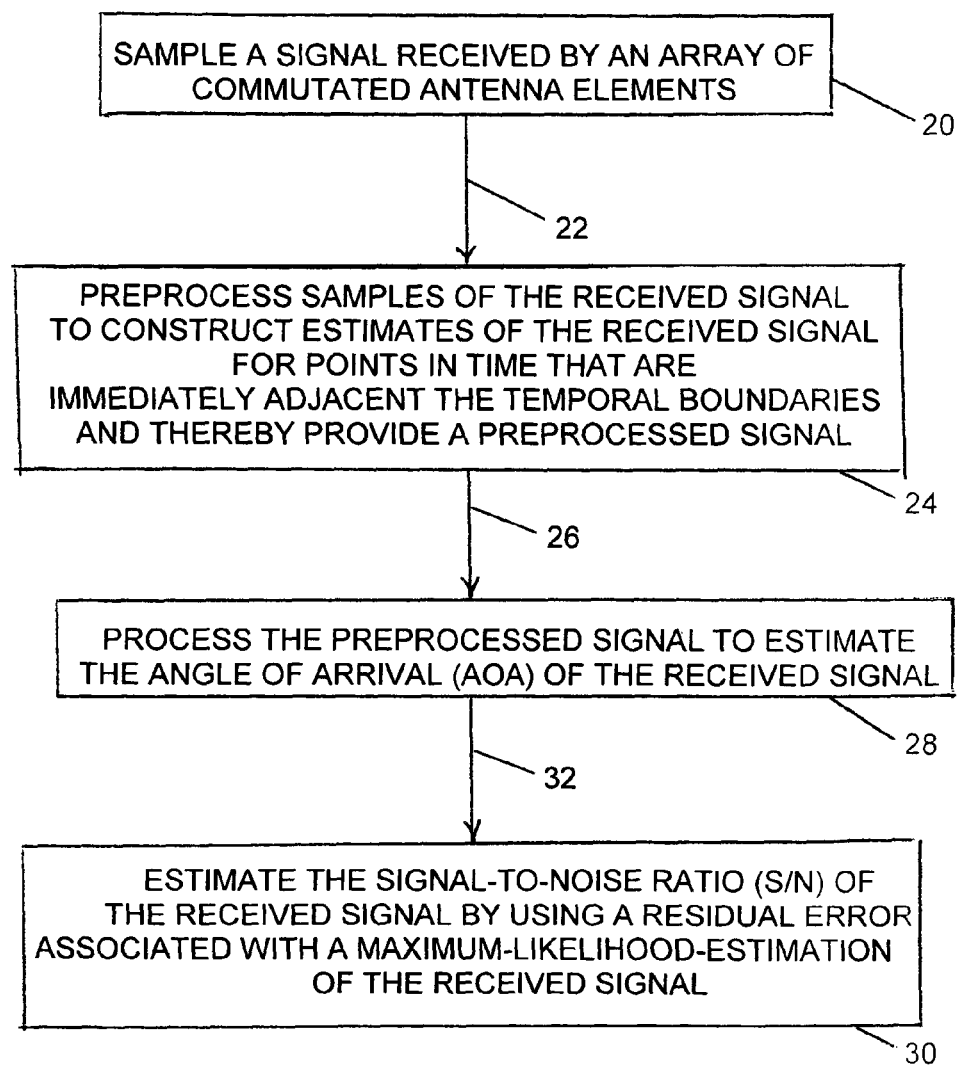
FIG. 2 is a diagram generally illustrating the methods of the present invention.

Referring to FIG. 2, a signal received by a selected array of commutated elements for one of the low, mid or high frequency bands is sampled, as shown at 20, to provide samples 22 of the received signal. It is assumed that the samples of the received signal are observed in zero-mean additive white Gaussian noise (AWGN), The provided samples 22 of the received signal are processed, as shown at 24, to construct estimates of the received signal for points in time that are immediately adjacent the temporal boundaries and thereby provide a preprocessed signal 26. The preprocessing step 24 constructs an estimate of the received signal immediately adjacent to the boundary by incorporating the bandwidth constraints of the received signal and recognizing that some samples near the boundary are unusable. Some received signals are FM modulated. FM modulation results in bandwidth expansion. The preprocessing step 24 is optimized for FM in that it suppresses noise that is both outside the bandwidth of the modulated signal and outside the bandwidth of the modulating signal.

The preprocessed signal 26 is processed, as shown at 28, to estimate the AOA of the signal received by the selected array of commutated antenna elements. The signal-to-noise ratio of the received signal is estimated, as shown at 30, by using a residual error 32 associated with the maximum-likelihood-estimation of the received signal.

Preferably, a maximum-likelihood-estimation (MLE) processing routine is used for both (a) constructing the estimates of the received signal for points in time that are immediately adjacent the temporal boundaries and thereby provide the preprocessed signal, and (b) estimating the AOA. MLE is preferred because it realizes certain asymptotic optimality. The exact form of the MLE routine depends upon the physical equations that govern the signals received by the array and upon the statistical properties of the preprocessed signal.

The improvement afforded by the asymptotic optimality of the MLE routine in AOA estimation is manifold. The MLE routine computes an estimate hundreds of times faster than previous methods. In turn, the MLE routine may be used for received signals that are highly agile (i.e. fast hoppers). Alternatively, with longer observation times the AOA may be estimated with much better accuracy than previously.

Discrete-Time Complex Received Signal Characterization

U.S. Pat. No. 5,323,167 discloses the equations that characterize a signal received by a low-band antenna array having a whip antenna element and a loop antenna element as:

$$y_1^R(t) = \sin(2\pi ft) + A\,\cos(\phi)\cos(2\pi ft) \qquad [\text{Eq. 1}]$$

$$y_2^R(t) = \sin(2\pi ft) + A\,\sin(\phi)\cos(2\pi ft)$$

$$y_3^R(t) = \sin(2\pi ft) - A\,\cos(\phi)\cos(2\pi ft)$$

$$y_4^R(t) = \sin(2\pi ft) - A\,\sin(\phi)\cos(2\pi ft)$$

f is the frequency of the received signal. In each Equation 1, the first term is due to the whip antenna element and the second term is due to the loop antenna element. A is the unknown gain of the loop antenna element relative to the whip antenna element, where A>0. The objective is to determine the AOA $\phi$ where $-\pi \leq \phi \leq \pi$.

Equations 1 are for real signals and continuous time. For analytical convenience, these equations are restated using complex signals and discrete time. Begin by examining just the first equation of Equations 1 and reformulating this equation for discrete time.

$$y_1^R(n) = \sin(\omega n) + A\cos(\phi)\cos(\omega n) \quad [\text{Eq. 2}]$$

where $\omega$ is the sampled frequency of the received signal.

From a signal processing perspective, the problem is not completely stated in Equation 2. Writing the sinusoidal whip component as $\sin(\omega n)$ implies that the amplitude and phase of this component are known, and that the amplitude is 1 and the phase is 0. Of course, the amplitude and phase of this component are not really known, and must be estimated. Writing the unknown amplitude as B and the unknown phase as $\theta$ yields, $$y_1(n) = B\sin(\omega n + \theta) + A\cos(\phi)\cos(\omega n + \theta) \quad [\text{Eq. 3}]$$

Notice that $\theta$ has also been included in the component for the loop antenna element. This is because both the whip component and the loop component are due to the received signal.

It is generally the case that complex signals are easier to work with, and such is the case here. Since $$\sin(x) = \text{Re}\left\{\frac{1}{i}e^{ix}\right\} \text{ and } \cos(x) = \text{Re}\{e^{ix}\}, \quad [\text{Eq. 4}]$$

$$\begin{aligned}
y_1^R(n) &= B\text{Re}\left\{\frac{1}{i}e^{i(\omega n + \theta)}\right\} + A\cos(\phi)\text{Re}\{e^{i(\omega n + \theta)}\} \quad [\text{Eq. 5}] \\
&= \text{Re}\left\{B\frac{1}{i}e^{i(\omega n + \theta)}\right\} + \text{Re}\{A\cos(\phi)e^{i(\omega n + \theta)}\} \\
&= \text{Re}\left\{B\frac{1}{i}e^{i(\omega n + \theta)} + A\cos(\phi)e^{i(\omega n + \theta)}\right\} \\
&= \text{Re}\left\{e^{i\theta}\left(\frac{1}{i}B + A\cos(\phi)\right)e^{i\omega n}\right\} \\
&= \text{Re}\{e^{i\theta}(+A\cos(\phi) - iB)e^{i\omega n}\}
\end{aligned}$$

Letting $s = e^{i\theta}(+A\cos(\phi) - iB)$, [Eq. 6]

$$\begin{aligned}
y_1^R(n) &= \text{Re}\{se^{i\omega n}\} \quad [\text{Eq. 7}] \\
&= \text{Re}\{|s|e^{i\arg(s)}e^{i\omega n}\} \\
&= |s|\cos(\omega n + \arg(s)) \\
&= |s|\frac{e^{+i(\omega n + \arg(s))} + e^{-i(\omega n + \arg(s))}}{2}
\end{aligned}$$

Let h be a complex filter with transfer function $$H(e^{i\omega}) = \begin{cases} 1 & \text{if } 0 < \omega \leq \pi \\ 0 & \text{if } -\pi < \omega \leq 0 \end{cases} \quad [\text{Eq. 8}]$$

Applying the filter 2h to $y_1^R(n)$ yields, $$\begin{aligned}
y_1(n) &= (2h) * y_1^R(n) \quad [\text{Eq. 9}] \\
&= |s|e^{+i(\omega n + \arg(s))} \\
&= se^{i\omega n} \\
&= e^{i\theta}(+A\cos(\phi) - iB)e^{i\omega n}
\end{aligned}$$

$y_1(n)$ is the complex signal that will be much easier to work with.

Assume for the moment that $\omega$ as been accurately estimated and eliminated by mixing. Then $y_i(n)$ has no dependence on n and is given by $$y_1 = e^{i\theta}(+A\cos(\phi) - iB). \quad [\text{Eq. 10}]$$

Returning to the problem at hand, ultimately it is desired to estimate $\phi$. In order to do so, it is also necessary to estimate A, B, and $\theta$. A and B are unconstrained (positive) real numbers and $-\pi < \theta \leq \pi$. $y_1$ may be rewritten as $$y_1 = Ae^{i\theta}\left(+\cos(\phi) - i\frac{B}{A}\right). \quad [\text{Eq.11}]$$

$Ae^{i\theta}$ is simply some unconstrained complex number, and $$\frac{B}{A}$$

is some unconstrained (nonzero) positive real number. Let $$z = Ae^{i\theta} \text{ and } D = \frac{B}{A}.$$

Then $y_1$ is given by, $$y_1 = z(+\cos(\phi) - iD) \quad [\text{Eq. 12}]$$

The original problem for the low-band antenna array may now be stated using complex signals in discrete time.

$$y_1 = z(+\cos(\phi) - iD) \ y_2 = z(+\sin(\phi) - iD) \ y_3 = z(-\cos(\phi) - iD) \ y_4 = z(-\sin(\phi) - iD) \quad [\text{Eq.13}]$$

The equations for $y_2$, $y_3$, and $y_4$ have been obtained in a similar manner as previously described. z is some complex number, and D>0. It is desired to estimate the AOA, $\phi$. Signals received by an array of commutated antenna elements of the low-band type may be characterized by Equations 13, or some reordering of Equations 13 resulting from a different commutation order.

Consider now a signal received by a mid-band or high-band array of commutated antenna elements. These are N-element phased-arrays where N is either 4 or 8. The elements are circularly arranged with constant radius r and spaced by $$\frac{360°}{N}.$$

The first element is denoted as 0 and is located at 90°, and successive elements are numbered counter-clockwise. The (complex) equations that characterize the received signal are, $$y_k(t) = e^{i\psi_k} \times z(t) e^{i2\pi ft} \quad [\text{Eq. 14}]$$

where $$\psi_k = 2\pi \frac{r}{\lambda} \sin\left(\phi - \frac{\pi}{2} - k\frac{2\pi}{N}\right) \quad [\text{Eq. 15}]$$

In equation 14, f is the center frequency of the received signal. $z(t)e^{i2\pi ft}$ is the received signal that would be measured at the center of the array (i.e. at the origin). $z(t)$ is due to modulation of the target signal. (It is assumed that, while $z(t)$ is a function of time, $z(t)$ is approximately constant over a time of $2r/c$ where c is the speed of light.) $\psi_k$ is the phase change that results from moving from the center of the array to the position of element k at time t. Consider equation 15. $\phi$ is the angle of arrival of the received signal. On a line passing through the origin of angle $\phi$, the phase of the received signal is a constant. The phase difference $\psi_k$ of element k may be computed by determining the distance from element k to this line, $d_k$. Then, $\psi_k = 2\pi d_k/\lambda$, where $\lambda = 1/f$ is the wavelength of the received signal. (All points that are at a distance that is an integral multiple of $\lambda$ from the line of angle $\phi$ have the same phase as points on the line of angle $\phi$.) $d_k = r|\sin(\theta_k - \phi)|$ where $\theta_k$ is the angular position of element k. For this array configuration, $$\theta_k = \frac{\pi}{2} + k\frac{2\pi}{N}.$$

The sign difference of $\sin(\theta_k - \phi)$ is understood by considering two elements, one at $(+r, 0)$ and one at $(-r, 0)$. For $\phi$ small and only slightly greater than 0, the phase differences are moving linearly away from zero with opposite signs.

From the earlier discussion relating to the low-band antenna it is immediately apparent that the discrete-time equations are, $$y_k(n) = e^{i\psi_k} x z(n) e^{i\omega n} \quad [\text{Eq. 16}]$$

Equation 15 does not depend on time and is unchanged. It is assumed that $\omega$ is perfectly estimated and mixed off by an external process. This yields, $$y_k(n) = z(n) e^{i\psi_k} \quad [\text{Eq. 17}]$$

Signals received by an array of commutated antenna elements of the mid or high-band type may be characterized by Equations 17, or some reordering of Equations 17 resulting from a different commutation order.

Preprocessing

Consider a complex random process with a non-zero power spectrum contained in the interval $$\left[-\frac{\beta}{2}, +\frac{\beta}{2}\right].$$

With a deterministic perspective, any waveform $x(t)$ from this process may be reconstructed from samples $x(n)$ taken at intervals no larger than $$\frac{1}{\beta},$$

in accordance with the Sampling Theorem. Suppose for the sake of concreteness that samples $y(n)$ are taken at a rate of $4 \times \beta$ samples/s. Furthermore, assume that the samples are noisy and that the noise $v(n)$ is AWGN. Since $x(n)$ may be reconstructed from every fourth sample, $y(n)$ may be written as, $$\begin{pmatrix} \vdots \\ y(-1) \\ y(0) \\ y(+1) \\ \vdots \end{pmatrix} = A \begin{pmatrix} \vdots \\ x(-4) \\ x(0) \\ x(+4) \\ \vdots \end{pmatrix} + \begin{pmatrix} \vdots \\ v(-1) \\ v(0) \\ v(+1) \\ \vdots \end{pmatrix} \quad [\text{Eq. 18}]$$

where $$A = \begin{pmatrix} & \vdots & & \\ h(-2+4) & h(-2) & h(-2-4) \\ h(-1+4) & h(-1) & h(-1-4) \\ \cdots & h(+4) & h(0) & h(-4) & \cdots \\ h(+1+4) & h(+1) & h(+1-4) \\ h(+2+4) & h(+2) & h(+2-4) \\ & \vdots & & \end{pmatrix} \quad [\text{Eq. 19}]$$

and $$h(n) = \begin{cases} 1 & \text{if } n = 0 \\ \dfrac{\sin\left(\pi\frac{n}{4}\right)}{\pi\frac{n}{4}} & \text{if } n \neq 0 \end{cases} \quad [\text{Eq. 20}]$$

$h(n)$ is a discrete-time sinc function with zeros for n a non-zero multiple of 4. This is an ideal low-pass function of digital bandwidth $$\frac{2\pi}{4}.$$

This may be written more compactly as, $$y = Ax + v \quad [\text{Eq. 21}]$$

Assume that the dimensions of this problem are large but finite. The probability density function of v is given by, $$fv(v) = \frac{1}{(2\pi\sigma^2)^N} e^{-\frac{\|v\|^2}{2\sigma^2}} \quad [\text{Eq. 22}]$$

As has been previously discussed, the MLE of x may then be determined as, $$\tilde{x} = \operatorname{argmin}_x \|y - Ax\|^2 \quad [\text{Eq. 23}]$$

and it follows that, $$\tilde{x} = (A^*A)^{-1} A^* y \quad [\text{Eq. 24}]$$

The key observation here is that the columns of the matrix A are nearly orthogonal. This may be seen as follows. Consider the inner-product of the column immediately right of center and the center column, $$A^*A_{+1,0} = \sum_i \overline{h(i-4)}h(i) \approx (h*h)(4) \qquad [\text{Eq. 25}]$$

h*h is the convolution of an ideal low-pass function with itself. Thinking of this as a filtering operation, the response of an ideal low-pass filter to an ideal low-pass input is the input itself. Hence $$h*h = c \times h \qquad [\text{Eq. 26}]$$

and $$A^*A_{+1,0} \approx c \times h(4) = 0 \qquad [\text{Eq. 27}]$$

The result is similar with other columns, and so A is approximately orthogonal.

Returning to equation 24, $(A^*A)^{-1} \approx c' \times I$ and $$\tilde{x} = c' \times A^*y \qquad [\text{Eq. 28}]$$

Therefore, interpreting the columns of A as translated ideal low-pass filters, the MLE of x is obtained simply by filtering y. Note however that this is only true (approximately) under the assumption that the dimensions of the problem are large. As the dimension of the problem decreases, it is no longer true that, $(A^*A)^{-1} \approx c' \times I$ and $\tilde{x}$ must be determined by Equation 24.

Preprocessing of the received signal is performed for two different types of modulation, SB and FM. SB may be regarding as subsuming AM. The SB estimator is a linear function of the received signal. Thus the SB estimator normally is distributed, and the statistical support for the AOA estimation methods remains intact.

Consider now the SB estimator and refer to Equation 18. Recall from previous discussion that there is an interval around the boundary that is unusable. Suppose that 2M+1 samples are unusable for some M.

On the left side of the boundary, $$\begin{pmatrix} \vdots \\ y(M-3) \\ y(M-2) \\ y(M-1) \end{pmatrix} = A_L \begin{pmatrix} \vdots \\ x(-4) \\ x(0) \\ x(+4) \\ \vdots \end{pmatrix} + \begin{pmatrix} \vdots \\ v(M-3) \\ v(M-2) \\ v(M-1) \end{pmatrix} \qquad [\text{Eq. 29}]$$

$A_L$ is the upper half of A less the last M+1 rows that correspond to unusable samples. Equation 29 may be written more compactly as, $$y_L = A_L x_L + v_L \qquad [\text{Eq. 30}]$$

The MLE of x may be determined by, $$\tilde{x}_L = \text{argmin}_{x_L} \|y_L - A_L x_L\|^2 \qquad [\text{Eq. 31}]$$

and it follows that, $$\tilde{x}_L = (A^*_L A_L)^{-1} A^*_L y_L \qquad [\text{Eq. 32}]$$

Let $x(0)^-$ denote the value of $x(0)$ computed on the left (earlier) side of the boundary, $$x(0)^- = \{(A^*_L A_L)^{-1} A^*_L y_L\}_0 \qquad [\text{Eq. 33}]$$

Here the subscript 0 refers to the element corresponding to $x(0)$.

Similarly, on the right (later) side of the boundary, $$\begin{pmatrix} y(M+1) \\ y(M+2) \\ y(M+3) \\ \vdots \end{pmatrix} = A_R \begin{pmatrix} \vdots \\ x(-4) \\ x(0) \\ x(+4) \\ \vdots \end{pmatrix} + \begin{pmatrix} v(M+1) \\ v(M+2) \\ v(M+3) \\ \vdots \end{pmatrix} \qquad [\text{Eq. 34}]$$

$A_R$ is the lower half of A less the first M+1 rows that correspond to unusable samples. Let $x(0)^+$ denote the value of $x(0)$ computed on the right side of the boundary, $$x(0)^+ = \{(A^*_R A_R)^{-1} A^*_R y_R\}_0 \qquad [\text{Eq. 35}]$$

For computational efficiency, $(A^*_L A_L)^{-1}$ and $(A^*_R A_R)^{-1}$ may be precomputed for different β. Furthermore, it is only necessary to implement the left side processing. The right side result may be computed using the left side processing by reversing the input $y_R$.

Consider now the FM problem, and suppose that z is obtained by digital FM discrimination of y. Specifically, $$z = FM^{-1}(y') \qquad [\text{Eq. 36}]$$

$$\Rightarrow z_n = \text{Arg}(y'_{n+1} \overline{y'_n})$$

z is purely real. Note that in equation 36, y' is used rather than y. This is explained subsequently.

It has been demonstrated that when A is sufficiently large x may be obtained by filtering. This filtering rejects noise that is outside the bandwidth β. For small A linear algebra theory provides more insight. The MLE of x is obtained by solving a least-squares problem, and the optimal Ax is the projection of y onto the column space of A. This process rejects the component of the noise in the orthogonal complement of the column space of A (i.e. the null space of A*).

In general, y is observed in a wide bandwidth and many FM signals may be present. SB processing may be used to prevent other signals from "capturing" the FM discrimination.

$$y' = \begin{pmatrix} A_L(A^*_L A_L)^{-1} A^*_L y_L \\ A_R(A^*_R A_R)^{-1} A^*_R y_R \end{pmatrix} \qquad [\text{Eq. 37}]$$

Thus, y' has left side and right side components that are the projection of the respective components of y onto the column space of $A_L$ and $A_R$.

The FM estimator may be regarded as having two distinct β. Denote by $β_{SB}$ the bandwidth of the modulating signal, and by $β_{FM}$ the bandwidth of the FM modulated signal. $β_{FM} > β_{SB}$. In Equation 37 $A_L$ and $A_R$ are constructed using $β_{FM}$.

Recall that the complex gains on the left side and the right side of the boundary are different and depend upon the AOA, and there is a discontinuity in the FM discriminator output at the boundary. The discontinuity resides in an interval of unusable samples and z is otherwise a low-pass function of bandwidth $β_{SB}$. Therefore, $$\begin{pmatrix} \vdots \\ z(M-3) \\ z(M-2) \\ z(M-1) \\ z(M+1) \\ z(M+2) \\ z(M+3) \\ \vdots \end{pmatrix} = A \begin{pmatrix} \vdots \\ x(-4) \\ x(0) \\ x(+4) \\ \vdots \end{pmatrix} + \begin{pmatrix} \vdots \\ v(M-3) \\ v(M-2) \\ v(M-1) \\ v(M+1) \\ v(M+2) \\ v(M+3) \\ \vdots \end{pmatrix} \quad [\text{Eq. 38}]$$

Note that the notation in Equation 38 is consistent with the previous constructions, but it should not be construed that the values of A, x, v, or M are the same. In particular, A is constructed using $\beta_{SB}$. This clearly impacts an optimal x. v is a noise process derived from FM discrimination.

z may be estimated as, $$\tilde{z} = A(A^*A)^{-1}A^*z \quad [\text{Eq. 39}]$$

$\tilde{z}$ is an estimate of the FM modulating process. y may be estimated by FM modulating $\tilde{z}$, $$\tilde{y} FM(\tilde{z}) \quad [\text{Eq. 40}]$$

The complex gain on the left and right side of the boundary respectively may be estimated as, $$\widetilde{x(0)^{-,+}} = \mathrm{argmin}_{x(0)-,+} \| y_{L,R} - \tilde{y}_{L,R} - \tilde{y}_{L,R} x(0)^{-,+} \|^2 \quad [\text{Eq. 41}]$$
$$\Longrightarrow \widetilde{x(0)^{-,+}} = <\tilde{y}_{L,R}, y_{L,R}> / <\tilde{y}_{L,R}, \tilde{y}_{L,R}>$$

<*, *> denotes complex inner product.

Equations 36 through 41 provide the preprocessing methodology for FM.

Although it may seem that the SB estimator is sufficient for FM, and that the FM estimator is not required, the deficiency of such an approach is that it estimates y as any signal of bandwidth $\beta_{FM}$, even though not all signals of bandwidth $\beta_{FM}$ are actually possible. The only possible y are those that arise by FM modulating a signal of bandwidth $\beta_{SB}$. The FM estimator enforces this constraint, whereas the SB estimator would erroneously enlarge the parameter space in the parameter estimation problem.

Consider again the SB estimator and Equation 29. $x(0)^-$ is estimated from samples only on the left side of the boundary. For the FM estimator, in Equation 21 samples on both sides of the boundary are used. In the SB case the difficulty is the different complex gain on each side of the boundary, and the objective of the algorithm is to estimate this. (This is less problematic for the FM estimator because the difference produces a discontinuity in the FM discrimination output that is in an interval of samples that are unusable in any case).

There is an alternative method for the SB estimator that yields better performance but is more computationally difficult, $$y = \begin{pmatrix} A_L \\ sA_R \end{pmatrix} x + v \quad [\text{Eq. 42}]$$

$$\min_{z_{s,x}} \left\| y - \begin{pmatrix} A_L \\ sA_R \end{pmatrix} x \right\|^2$$

Let $$A = \begin{pmatrix} A_L \\ sA_R \end{pmatrix}.$$

For any particular s, $\tilde{x}(s) = (A^*A)^{-1}A^*y$. $\tilde{s}$ may be determined by minimizing $\|y - A\tilde{x}(s)\|^2$. This method is more computationally difficult because in the computation of $\tilde{x}(s)$ the matrix $(A^*A)^{-1}$ depends upon s. The estimated gain on the left side of the boundary is $x(0)^- = \tilde{x}_0$, and the estimated gain on the right side of the boundary is $x(0)^+ = x\tilde{x}_0$. An example of source code for this method is set forth in FIGS. 3A, 3B and 3C.

Estimation of the AOA

The estimation of the AOA is treated in each of the two cases previously described, the low-band antenna and the mid-band and high-band antennas. For each antenna configuration two cases are separately considered, depending upon whether the modulation of the target signal portion of the received signal is unknown or known and entered into the receiver/processor 12.

Consider first the case of the low-band antenna and a target signal of known modulation. Refer to Equations 13. Recall $$D = \frac{B}{A}$$

where D is some unknown constant relating the gains of the whip and loop antennas. Similarly, $z = Ae^{i\theta}$ where A and $\theta$ are the unknown amplitude and phase of the received signal. We may regard A and $\theta$ as arising from the channel and over small intervals of time these may be taken as constant. Suppose that the received signal is unmodulated. Then z is constant and Equations 13 may be rewritten more compactly in matrix form as, $$y = Az \quad [\text{Eq. 43}]$$

where y is the vector of received samples, $$A = \begin{pmatrix} +\cos(\phi) - iD \\ +\sin(\phi) - iD \\ -\cos(\phi) - iD \\ -\sin(\phi) - iD \end{pmatrix} \quad [\text{Eq. 44}]$$

and z is a complex scalar. A depends upon on $\phi$ and D. When the target signal is modulated z is no longer constant. However, the changes in z that are attributable to target signal modulation may simply be absorbed into the rows of A, as they are assumed known, and z may remain exactly as in this formulation, as a model the unknown amplitude and phase of the receive signal. Thus, in the ensuing discussion we regard this as a formulation for a target signal of known modulation.

The vector y is observed in the presence of noise, and it will be assumed that this noise is zero-mean additive white Gaussian noise (AWGN). Let v denote the vector of noise samples. Thus, $$y = Az + v \quad [\text{Eq. 45}]$$

and the probability density function of v is given by, $$f_V(v) = \frac{1}{(2\pi\sigma^2)^4} e^{-\frac{\|v\|^2}{2\sigma^2}} \quad [\text{Eq. 46}]$$

The estimate of $\phi$ that will be determined is the Maximum Likelihood Estimate (MLE). Consider that the statement, the parameters of the problem are z, D, and $\phi$, is equivalent to the statement, v=y−Az. The MLE method is to choose the parameters of the problem that imply the v that has maximum probability density. $f_v(v)$ is maximum when $\|v\|^2$ is minimum, thus the MLE of $\phi$ is that value for which $\|y-Az\|^2$ is minimum.

The problem of determining the MLE of $\phi$ may be stated as, $$\phi = \text{argima}_\phi \|y - Az\|^2 \qquad [\text{Eq. 47}]$$

This is a problem in z, D, and $\phi$.

Notice that for a fixed D and $\phi$, z may be determined by the method of least-squares. Let $\tilde{z}$ denote the optimal z, a function of D and $\phi$. It is a classic result from linear-algebra that if A has full-rank, $$A^*A\tilde{z} = A^*y \qquad [\text{Eq. 48}]$$
$$\Longrightarrow \tilde{z} = (A^*A)^{-1}A^*y$$

The optimal error $\tilde{e} = y - A\tilde{z}$, and $\tilde{e}$ is orthogonal to the column space of A. That is, $A^*\tilde{e} = 0$. Thus, $$\|\tilde{e}\|^2 = (y - A\tilde{z})^*\tilde{e} \qquad [\text{Eq. 49}]$$
$$= y^*\tilde{e} - \tilde{z}A^*\tilde{e}$$
$$= y^*\tilde{e}$$
$$= y^*(y - A\tilde{z})$$
$$= \|y\|^2 - y^*A\tilde{z}$$

This expression is a function of $\phi$ and D. The dependence on $\phi$ and D is in the matrix A.

The problem has thus been reduced to, $$\phi = \text{argmin}_\phi \{\|y\|^2 - y^*A\tilde{z}\} \qquad [\text{Eq. 50}]$$

The first term in the objective, $\|y\|^2$ does not depend on $\phi$ (or D), hence it is equivalent to instead let $$\phi = \text{argmax}_\phi \{y^*A\tilde{z}\} \qquad [\text{Eq. 51}]$$
$$= \text{argmax}_\phi \{y^*A(A^*A)^{-1}A^*y\}$$

Because A is full-rank, $A^*A$ is positive-definite, and so is $(A^*A)^{-1}$. Here, this is a trivial statement, but later A will have more than a single non-zero column. Therefore, $(A^*A)^{-1} = WW^*$ for some W. W may be computed by a Cholesky factorization, or by LDU factorization observing that $(A^*A)^{-1}$ is Hermitian (i.e. $L = U^*$). Then, $$\phi = \text{argmax}_\phi \{y^*AWW^*A^*y\} \qquad [\text{Eq. 52}]$$
$$= \text{argmax}_\phi \|W^*A^*y\|^2$$
$$= \text{argmax}_\phi \|By\|^2$$

where $B = W^*A^*$.

It was initially assumed that $\omega$ was perfectly estimated and eliminated by mixing. This is not a realistic assumption. Recall, without this assumption, $$y_1(n) = z(+\cos(\phi) - iD)e^{i\omega n} \qquad [\text{Eq. 53}]$$

If $\omega n$ is sufficiently small, then $$y_1(n) \approx z(+\cos(\phi) - iD) \qquad [\text{Eq. 54}]$$

and, $y_1(n)$ is approximately a constant. Let $y_1$ denote this constant. $y_1$ may be estimated by mixing to eliminate the frequency error and then averaging. That is, $$y_1 = \sum_n e^{-i\omega n} y_1(n) \qquad [\text{Eq. 55}]$$

and this expression may be efficiently computed for different values of $\omega$ using a Fast Fourier Transform (FFT).

Suppose $y_k$ is computed as described and that the sequence $y_1, y_2, y_3, y_4$ results. There is always some error in the estimation of $\omega$. This error may be simply incorporated into the matrix statement of the problem as, $$\Delta y = Az + v \qquad [\text{Eq. 56}]$$

where $$\Delta = \begin{pmatrix} 1 & 0 & \cdots \\ 0 & e^{-i\delta} & 0 \\ \vdots & 0 & e^{-i2\delta} \\ & & & \ddots \end{pmatrix} \qquad [\text{Eq. 57}]$$

and $\delta$ is frequency offset in cycles/sample. Proceeding as before one obtains the MLE for $\phi$ as, $$\phi = \text{argmax}_\phi \|B\Delta y\|^2 \qquad [\text{Eq. 58}]$$

The only subtlety occurs in concluding that $\|\Delta y\|^2$ does not depend on $\phi$, D, or $\delta$. This minimization is over the parameters $\phi$, D, and $\delta$, but notice that fixing $\phi$ and D fixes B and, $$\|B\Delta y\|^2 = \left\| B \begin{pmatrix} y_1 \\ e^{-i\delta}y_2 \\ e^{-i2\delta}y_3 \\ e^{-i3\delta}y_4 \end{pmatrix} \right\|^2 \qquad [\text{Eq. 59}]$$
$$= \left\| \begin{matrix} B_{1,1}y_1 + B_{1,2}e^{-i\delta}y_2 + B_{1,3}e^{-i2\delta}y_3 + B_{1,4}e^{-i3\delta}y_4 \\ B_{2,1}y_1 + B_{2,2}e^{-i\delta}y_2 + B_{2,3}e^{-i2\delta}y_3 + B_{2,4}e^{-i3\delta}y_4 \\ \vdots \end{matrix} \right\|^2$$
$$= \sum_m |B_{m,1}y_1 + B_{m,2}e^{-i\delta}y_2 + B_{m,3}e^{-i2\delta}y_3 + B_{m,4}e^{-i3\delta}y_4|^2$$

In this formulation A has only a single column, and this implies that B has only a single row. A more general formulation that models the modulation of the received signal would result in A with more than a single column.

$$B_{m,1}y_1 + B_{m,2}e^{-i\delta}y_2 + B_{m,3}e^{-i2\delta}y_3 + B_{m,4}e^{-i3\delta}y_4 \qquad [\text{Eq. 60}]$$

may be efficiently computed for different $\delta$ using an FFT.

The MLE of $\phi$ may be reasonably determined by a numerical method. The method of steepest ascent is one approach. It is desired to determine, $$\phi = \text{argmax}_\phi \|B\Delta y\|^2 \qquad [\text{Eq. 61}]$$

Regard this as a search for the values of $\phi$ and D that maximize $\|B\Delta y\|^2$. Only the value of $\phi$ is of interest, but to determine $\phi$ one must also determine D. The method of steepest ascent iteratively moves in the direction of the gradient of $\|B\Delta y\|^2$, and this gradient may be numerically approximated by divided differences. This in turn requires evaluation of $\|B\Delta y\|^2$ for different values of $\phi$ and D (and $\delta$). For each value of $\phi$ and D, the $\delta$ that maximizes this expression is determined using the FFT, and the result is the desired value of $\|B\Delta y\|^2$, as a function of $\phi$ and D.

Now consider the low-band antenna and a target signal with unknown modulation. The previous discussion pertained to the model, $$y = Az + v \quad [\text{Eq. 62}]$$

and the development of the associated MLE for $\phi$. z was assumed to be a scalar constant. In this section, the problem will be generalized to a modulated target signal where the modulation is unknown.

In general, z(t) is a (complex) narrowband process of some bandwidth $\beta$. In accordance with the Sampling Theorem, z is entirely characterized by samples taken at $$\frac{1}{\beta},$$

and may be represented as a weighted linear combination of sinc translates with nulls to spaced by $$\frac{1}{\beta}.$$

The weights are the samples of z(t).

Examine z(t) in a small interval that is centered at the instant of a commutation between two antenna elements. The instant of commutation shall be referred to hereafter as a boundary. Let the duration of this interval be $\Delta T$. If $$\Delta T \ll \frac{1}{\beta},$$

then z(t) is approximately constant in the interval. Essentially, this is a "first-order" approximation that says that z(t) may be represented in the small interval using a single sinc centered on the boundary.

Suppose this first-order approximation is sufficient. The problem may be rewritten as $$y = Az + v \quad [\text{Eq. 63}]$$

where $$A = \quad [\text{Eq. 64}]$$

$$\begin{pmatrix} +\cos(\phi) - iD & & & \\ +\sin(\phi) - iD & & & \\ & +\sin(\phi) - iD & & \\ & -\cos(\phi) - iD & & \\ & & -\cos(\phi) - iD & \\ & & -\sin(\phi) - iD & \\ & & & -\sin(\phi) - iD \\ & & & +\cos(\phi) - iD \end{pmatrix}$$

With n as the number of boundaries, z is an n-tuple and y is a 2n-tuple. (In this example, n=4.) The matrix A has been modified to reflect the fact that samples are taken on both sides of the boundary, and so the equation of the antenna element is different on each side of the boundary.

The MLE for $\phi$ is given as in equation 13 where z is now a vector, $$\phi = \operatorname{argmin}_\phi \|y - Az\|^2 \quad [\text{Eq. 65}]$$

There was no assumption in the argument of the previous section that z was a scalar. Thus the argument that resulted in equation 51 remains intact and, $$\phi = \operatorname{argmax}_\phi \{y^* A(A^*A)^{-1} A^* y\} \quad [\text{Eq. 66}]$$

The matrix A is orthogonal, and the norm squared of any column of A is, $$\|a_{(*,i)}\|^2 = a_{(*,i)}^* a_{(*,i)} \quad [\text{Eq. 67}]$$
$$= |\pm\cos(\phi) - iD|^2 + |\pm\sin(\phi) - iD|^2$$
$$= \cos^2(\phi) - D^2 + \sin^2(\phi) + D^2$$
$$= 1 + 2D^2$$

Thus $A^*A = (1 + 2D^2)I$, and $$(A*A)^{-1} = \frac{1}{1 + 2D^2} I.$$

Therefore, $$\phi = \operatorname{argmax}_\phi \frac{1}{1 + 2D^2} \|A^* y\|^2 \quad [\text{Eq. 68}]$$

$\phi$ and D may be determined numerically, as before. The objective for the MLE is a function of the two variables $\phi$ and D.

Examination reveals that $\|A^*y\|^2$ is easy to compute, as A is sparse. Notice also that there is no need to model a small frequency offset $\delta$ as before, as the model of the modulation compensates for this over time.

It is interesting to note that there is a closed-form expression for $D(\phi)$ that maybe determined as $$\left\{ D \Big| \frac{\partial}{\partial D} \left( \frac{1}{1 + 2D^2} \|A^* y\|^2 \right) = 0 \right\} \quad [\text{Eq. 69}]$$

Then recognize that $\|A^*y\|^2$ is a quadratic polynomial in D, apply the quotient rule for the derivative, and only the numerator can contribute zeros. The resulting numerator is less than fifth degree, thus there is a closed-form solution. Similarly, there is also a closed-form expression for $\phi(D)$ that may be obtained using the method of Lagrange multipliers. Notice also the relationship between the expression $\|A^*y\|^2$ and $1+2D^2$. Without the quadratic in the denominator as well, the objective function could be made to increase without bound by increasing D. This would clearly be unacceptable. Why the denominator is $1+2D^2$ is simply in the math.

Consider now the case of the mid or high-band antenna array and a target signal of known modulation. The equations that govern the antenna are equations 16 and 17. Using these equations in the same manner as was done previously for the low-band antenna yields, $$y = z + v \quad [\text{Eq. 70}]$$

where the matrix A is given by, $$A = \begin{pmatrix} e^{i\psi_0} \\ e^{i\psi_1} \\ e^{i\psi_2} \\ \vdots \\ e^{i\psi_{M-1}} \end{pmatrix} \quad [\text{Eq. 71}]$$

and v is AWGN.

The MLE for $\phi$ is, $$\phi = \operatorname{argmin}_\phi \|y - Az\|^2 \quad [\text{Eq. 72}]$$

and allowing for $\delta$ error in the estimation of $\omega$ one obtains $$\phi = \operatorname{argmax}_\phi \|B \Delta y\|^2 \quad [\text{Eq. 73}]$$

where $B = W^*A^*$ and $(A^*A)^{-1} = WW^*$. With a general matrix A, W may be obtained in various ways, as previously discussed. Here though, $$(A*A)^{-1} = \frac{1}{M} \quad \text{and so} \quad W = \frac{1}{\sqrt{M}}.$$

Thus, $$B = \frac{1}{\sqrt{M}} A^*$$

it is equivalent to determine the MLE by, $$\phi = \operatorname{argmax}_\phi \|A^* \Delta y\|^2 \quad [\text{Eq. 74}]$$

Disregarding $\Delta$, observe that in a linear array configuration the phase change from element k to element k±1 is a constant that depends on $\phi$. Thus, A is a complex sinusoid, and problem of determining $\phi$ is simply a spectrum estimation problem. The inner-product of A and y is essentially a mixing and integration, and the $|*|^2$ is an energy calculation. There are many methods for this problem. Note that absorbing known modulation into the matrix A does not affect the AOA estimate as given by equation 74 other than the difference in the matrix A itself.

Consider now the case of the mid or high-band antenna and a target signal of unknown modulation. One may derive the MLE in the same manner previously described for the low-band antenna where $$A = \begin{pmatrix} e^{i\psi_0} & & & & & & \\ e^{i\psi_1} & & & & & & \\ & e^{i\psi_1} & & & & & \\ & e^{i\psi_2} & & & & & \\ & & e^{i\psi_2} & & & & \\ & & e^{i\psi_3} & & & & \\ & & & \ddots & & & \\ & & & & e^{i\psi_{K+0}} & \\ & & & & & e^{i\psi_{K+1}} \end{pmatrix} \quad [\text{Eq. 75}]$$

(K+1 may be reduced modulo N, the number of elements.) The MLE of $\phi$ is given by, $$\phi = \operatorname{argmax}_\phi \|By\|^2 \quad [\text{Eq. 76}]$$

where $B = W^*A^*$ and $(A^*A)^{-1} = WW^*$. (Recall that in this problem, $\Delta$ is not necessary, as this is modeled in the modulation.) Here $(A^*A)^{-1}$ also has a simple form, $(A^*A)^{-1} = \frac{1}{2} I$. Thus, it is equivalent to obtain the MLE as, $$\phi = \operatorname{argmax}_\phi \|A^* y\|^2 \quad [\text{Eq. 77}]$$

By considering the (sparse) structure of A, $$(A^* y)_m = e^{-i\psi_{m+0}} y_{2m+0} + e^{-i\psi_{m+1}} y_{2m+1} \quad [\text{Eq. 78}]$$

and $$\|A^* y\|^2 = \sum_m |(A^* y)_m|^2 \quad [\text{Eq. 79}]$$
$$= \sum_m |e^{-i\psi_{m+0}} y_{2m+0} + e^{-i\psi_{m+1}} y_{2m+1}|^2$$

Thus, the MLE may be rewritten as, $$\phi = \operatorname{argmax}_\psi \sum_m |e^{-i\psi_{m+0}} y_{2m+0} + e^{-i\psi_{m+1}} y_{2m+1}|^2 \quad [\text{Eq. 80}]$$

Notice that $$|e^{-i\psi_{m+0}} y_{2m+0} + e^{-i\psi_{m+1}} y_{2m+1}|^2 = \quad [\text{Eq. 81}]$$
$$|y_{2m+0}|^2 + 2\operatorname{Re}\left\{\overline{\left(e^{i\psi_{m+0}} e^{i\psi_{m+1}}\right)}(\overline{y_{2m+0}} y_{2m+1})\right\} + |y_{2m+1}|^2$$

Since $|y_{2m+0}|^2$ and $|y_{2m+1}|^2$ do not depend on $\phi$, the MLE may again be rewritten as, $$\phi = \operatorname{argmax}_\psi \operatorname{Re} \sum_m \overline{\left(e^{-i\psi_{m+0}} e^{i\psi_{m+1}}\right)}(\overline{y_{2m+0}} y_{2m+1}) \quad [\text{Eq. 82}]$$

This may be regarded as determining $\phi$ by maximizing the correlation of the sequence $\overline{e^{i\omega_{m+0}} e^{i\psi_{m+1}}}$ with the sequence $\overline{y_{2m+0}} y_{2m+1}$. (In this correlation, the first sequence is conjugated and the real part is taken, as with the complex inner-product.) $\overline{y_{2m+0}} y_{2m+1}$ is a sequence of observed phase differences on the array between consecutively sampled elements, and $e^{i\psi_{m+0}} e^{i\psi_{m+1}}$ is the sequence of ideal phase differences associated with the angle of arrival $\psi$.

The objective for the MLE is a function of the single variable $\phi$. The function may have local extremes. $\phi$ may be determined by numerical method. One approach is to sample the objective function taking as an initial approximation to $\phi$ the value that results in the largest value of the objective function. One may then search in a neighborhood around this point using a method such as bisection.

Estimation of Signal-to-Noise Ratio

In the previous discussion with $\phi=\phi_{MLE}$ and $D=D_{MLE}$, $A\tilde{z}$ is the estimated component of the received signal that is attributed to the target signal, whereas $y-A\tilde{z}$ is the estimated component of the received signal that is attributed to noise, and the observed signal is the sum of each of these estimated components, $$y = A\tilde{z} + (y - A\tilde{z}) \quad [\text{Eq. 83}]$$

Now consider signal-to-noise ratio defined as, $$\left(\frac{S}{N}\right)_{dB} = 10 \log_{10} \frac{\|A\tilde{z}\|^2}{\|y - A\tilde{z}\|^2} \quad [\text{Eq. 84}]$$

For a low-band type of antenna array having a whip antenna and a loop antenna as commutated array elements, when the modulation of the target signal portion of the received signal is unknown, it follows from the previous discussion that $$\|A\tilde{z}\|^2 = \frac{1}{1+2D^2}\|A*y\|^2 \quad [\text{Eq. 85}]$$

and $$\|y - A\tilde{z}\|^2 = \|y\|^2 - \frac{1}{1+2D^2}\|A*y\|^2. \quad [\text{Eq. 86}]$$

Therefore, $$\left(\frac{S}{N}\right)_{dB} = 10\log_{10} \frac{\frac{1}{1+2D^2}\|A*y\|^2}{\|y\|^2 - \frac{1}{1+2D^2}\|A*y\|^2} \quad [\text{Eq. 87}]$$

is an equivalent formulation.

With a received signal present, $A\tilde{z} \to y$ and $y - A\tilde{z} \to 0$ as the noise decreases. Thus, $\|A\tilde{z}\|^2 \to \|y\|^2$ and $\|y-A\tilde{z}\|^2 \to 0$ and therefore $$\left(\frac{S}{N}\right)_{dB} \to \infty.$$

An increasing signal-to-noise ratio indicates target signal presence and decreasing noise. Target signal detection may be accomplished by comparing the estimated signal-to-noise ratio to a threshold. When the signal-to-noise ratio is sufficiently large, target signal presence is declared. An increasing signal-to-noise ratio is also associated with decreasing noise. Hence as the signal-to-noise ratio increases the variation of $\phi_{MLE}$ about the true AOA, $\phi$ decreases. The value of the signal-to-noise ratio may be used to estimate this variation and is useful for subsequent estimates of the position of the source of a target signal and associated confidence regions.

Previous approaches on this problem have commonly used only $\|y\|^2$ for target signal detection rather than the signal-to-noise ratio. When the received signal energy exceeds some prescribed threshold, target signal presence is declared. The shortcoming of this approach may be easily understood. When no target signal is present and the received signal is noise only, there are many y for which $\|y\|^2$ is large and target signal presence can be declared by previous methods even though $\|y-A\tilde{z}\|^2$ is also large relative to $\|A\tilde{z}\|^2$. Signal presence should never be declared when $\|y-A\tilde{z}\|^2$ is large, as this indicates that the received signal is not consistent with the known physics of the antenna array and the relationship of received signal with the AOA. Erroneously accepting these y increases the false-alarm rate and thereby necessitates decreasing the detection threshold. In turn, decreasing the threshold reduces the detection rate when a target signal is present. $\|y\|^2$ is similarly a poor measure of the variation of $\phi_{MLE}$ about the true AOA, $\phi$.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A method of estimating the angle of arrival of a signal received by an array of commutated antenna elements, wherein there is a temporal boundary at the instant of commutation between antenna elements, comprising the steps of:
   (a) preprocessing samples of a signal received by an array of commutated antenna elements to construct estimates of the received signal for points in time that are immediately adjacent the temporal boundaries and thereby provide a preprocessed signal; and
   (b) estimating the angle of arrival of the received signal by processing the preprocessed signal;
   wherein step (b) comprises the step of:
   (c) for a low-band type of antenna, making a maximum-likelihood-estimation of the angle of arrival of the received signal; and
   wherein step (c) comprises the step of:
   (d) for a low-band type of antenna having a whip-antenna and a loop antenna as elements of the array, when the modulation of the received signal is known and the frequency offset of the received signal is unknown, making the maximum-likelihood-estimation of the angle of arrival $\phi$ of the received signal in accordance with the equation:

$$\phi = \text{argmax}_\phi \|B\Delta y\|^2$$

which is solved as a search for the values of $\phi$ and D that maximize $\|B\Delta y\|^2$ wherein $B=W*A*$, where $(A*A)^{-1}=WW*$ for some W, which may be computed by Cholesky factorization or by LDU factorization, and where $$A = \begin{pmatrix} +\cos(\phi) - iD \\ +\sin(\phi) - iD \\ -\cos(\phi) - iD \\ -\sin(\phi) - iD \end{pmatrix}$$

y is a vector of the constructed estimate components of the preprocessed signal; and D is some unknown constant relating the gains of the whip and loop antenna elements.

2. A method according to claim 1, wherein when the matrix A has more than a single column, $$\|B\Delta y\|^2 = \sum_m |B_{m,1} y_1 + B_{m,2} e^{-i\delta} y_2 + B_{m,3} e^{-i2\delta} y_3 + B_{m,4} e^{-i3\delta} y_4|^2$$

is computed for different frequency offsets δ by using a Fast Fourier Transform.

3. A method of estimating the angle of arrival of a signal received by an array of commutated antenna elements, wherein there is a temporal boundary at the instant of commutation between antenna elements, comprising the steps of:
   (a) preprocessing samples of a signal received by an array of commutated antenna elements to construct estimates of the received signal for points in time that are immediately adjacent the temporal boundaries and thereby provide a preprocessed signal; and
   (b) estimating the angle of arrival of the received signal by processing the preprocessed signal;
   wherein step (b) comprises the step of:
   (c) for a low-band type of antenna, making a maximum-likelihood-estimation of the angle of arrival of the received signal; and
   wherein step (c) comprises the step of:
   (d) for a low-band type of antenna having a whip-antenna and a loop antenna as elements of the array, when the modulation of the received signal is unknown, making the maximum-likelihood-estimation of the angle of arrival φ of the received signal in accordance with the equation:

$$\phi = \operatorname{argmin}_\phi \|y - Az\|^2$$

wherein y is a vector of the constructed estimate components of the preprocessed signal;

$$A = \begin{pmatrix} +\cos(\phi) - iD & & & \\ +\sin(\phi) - iD & & & \\ & +\sin(\phi) - iD & & \\ & -\cos(\phi) - iD & & \\ & & -\cos(\phi) - iD & \\ & & -\sin(\phi) - iD & \\ & & & -\sin(\phi) - iD \\ & & & +\cos(\phi) - iD \end{pmatrix}$$

where D is some unknown constant relating the gains of the whip and loop antenna elements; and z is a weighted linear combination of sinc translates of the constructed estimate components of the preprocessed signal for opposite sides of a said boundary.

4. A method of estimating the angle of arrival of a signal received by an array of commutated antenna elements, wherein there is a temporal boundary at the instant of commutation between antenna elements, comprising the steps of:
   (a) preprocessing samples of a signal received by an array of commutated antenna elements to construct estimates of the received signal for points in time that are immediately adjacent the temporal boundaries and thereby provide a preprocessed signal; and
   (b) estimating the angle of arrival of the received signal by processing the preprocessed signal;
   wherein step (b) comprises the step of:
   (c) for a low-band type of antenna, making a maximum-likelihood-estimation of the angle of arrival of the received signal; and
   wherein step (c) comprises the step of:
   (d) for a low-band type of antenna having a whip-antenna and a loop antenna as elements of the array, when the modulation of the received signal is unknown, making the maximum-likelihood-estimation of the angle of arrival φ of the received signal in accordance with the equation:

$$\phi = \operatorname{argmax}_\phi \frac{1}{1 + 2D^2} \|A * y\|^2$$

wherein y is a vector of the constructed estimate components of the preprocessed signal;

$$A = \begin{pmatrix} +\cos(\phi) - iD & & & \\ +\sin(\phi) - iD & & & \\ & +\sin(\phi) - iD & & \\ & -\cos(\phi) - iD & & \\ & & -\cos(\phi) - iD & \\ & & -\sin(\phi) - iD & \\ & & & -\sin(\phi) - iD \\ & & & +\cos(\phi) - iD \end{pmatrix}$$

and

D is some unknown constant relating the gains of the whip and loop antenna elements.

5. A method of estimating the angle of arrival of a signal received by an array of commutated antenna elements, wherein there is a temporal boundary at the instant of commutation between antenna elements, comprising the steps of:
   (a) preprocessing samples of a signal received by an array of commutated antenna elements to construct estimates of the received signal for points in time that are immediately adjacent the temporal boundaries and thereby provide a preprocessed signal; and
   (b) estimating the angle of arrival of the received signal by processing the preprocessed signal;
   wherein step (b) comprises the step of:
   (c) for a mid-band or high-band type of antenna, when the modulation of the received signal is known and the frequency offset of the received signal is unknown, making a maximum-likelihood-estimation of the angle of arrival φ of the received signal in accordance with the equation:

$$\phi = \operatorname{argmax}_\phi \|B\Delta y\|^2$$

which is solved as a search for the values of φ and D that maximize $\|B\Delta y\|^2$ wherein B=W*A*, where (A*A)$^{-1}$=WW* for some W, which may be computed by Cholesky factorization or by LDU factorization, and where A is a matrix:

$$A = \begin{pmatrix} e^{i\psi_0} \\ e^{i\psi_1} \\ e^{i\psi_2} \\ \vdots \\ e^{i\psi_{M-1}} \end{pmatrix}$$

where $\psi$ is a function of $\phi$;
y is a vector of the constructed estimate components of the preprocessed signal; and
D is some unknown constant relating the gain of the antenna elements.

6. A method according to claim 5, wherein when the matrix A has more than a single column, $$\|B\Delta y\|^2 = \sum_m |B_{m,1}y_1 + B_{m,2}e^{-i\delta}y_2 + B_{m,3}e^{-i2\delta}y_3 + B_{m,4}e^{-i3\delta}y_4|^2$$

is computed for different frequency offsets $\delta$ by using a Fast Fourier Transform.

7. A method of estimating the angle of arrival of a signal received by an array of commutated antenna elements, wherein there is a temporal boundary at the instant of commutation between antenna elements, comprising the steps of:
  (a) preprocessing samples of a signal received by an array of commutated antenna elements to construct estimates of the received signal for points in time that are immediately adjacent the temporal boundaries and thereby provide a preprocessed signal; and
  (b) estimating the angle of arrival of the received signal by processing the preprocessed signal;
  wherein step (b) comprises the step of:
  (c) for a mid-band or high-band type of antenna, when the modulation of the received signal is unknown, making a maximum-likelihood-estimation of the angle of arrival $\phi$ of the received signal in accordance with the equation:

$$\phi = \operatorname{argmax}_\phi \|By\|^2$$

which is solved as a search for the values of $\phi$ and D that maximize $\|By\|^2$ wherein $B = W^*A^*$, where $(A^*A)^{-1} = WW^*$ for some W, which may be computed by Cholesky factorization or by LDU factorization, and where A is a matrix:

$$A = \begin{pmatrix} e^{i\psi_0} & \\ e^{i\psi_1} & \\ & e^{i\psi_1} \\ & e^{i\psi_2} \\ & & e^{i\psi_2} \\ & & e^{i\psi_3} \\ & & & \ddots \\ & & & & e^{i\psi_{K+0}} \\ & & & & e^{i\psi_{K+1}} \end{pmatrix}$$

where $\psi$ is a function of $\phi$;
y is a vector of the constructed estimate components of the preprocessed signal; and
D is some unknown constant relating the gain of the antenna elements.

8. A method of estimating the angle of arrival of a signal received by an array of commutated antenna elements, wherein there is a temporal boundary at the instant of commutation between antenna elements, comprising the steps of:
  (a) preprocessing samples of a signal received by an array of commutated antenna elements to construct estimates of the received signal for points in time that are immediately adjacent the temporal boundaries and thereby provide a preprocessed signal; and
  (b) estimating the angle of arrival of the received signal by processing the preprocessed signal;
  wherein step (b) comprises the step of:
  (c) for a mid-band or high-band type of antenna, when the modulation of the received signal is unknown, making a maximum-likelihood-estimation of the angle of arrival $\phi$ of the received signal in accordance with the equation:

$$\phi = \operatorname{argmax}_\psi \operatorname{Re} \sum_m \overline{\left(e^{i\psi_{m+0}}e^{i\psi_{m+1}}\right)} \left(\overline{y_{2m+0}}y_{2m+1}\right)$$

which is solved by maximizing the correlation of the sequence $e^{i\psi_{m+0}}e^{i\psi_{m+1}}$ with the sequence $\overline{y_{2m+0}}y_{2m+1}$.
wherein $\overline{y_{2m+0}}y_{2m+1}$ is a sequence of observed phase differences on the array between consecutively sampled elements, and $e^{i\psi_{m+0}}e^{i\psi_{m+1}}$ is the sequence of ideal phase differences associated with, the angle of arrival $\phi$.

9. A method of estimating the signal-to-noise ratio of a signal received by an array of commutated antenna elements, wherein there is a temporal boundary at the instant of commutation between antenna elements, comprising the steps of:
  (a) preprocessing samples of a signal received by an array of commutated antenna elements to construct estimates of the received signal for points in time that are immediately adjacent the temporal boundaries and thereby provide a preprocessed signal;
  (b) estimating the angle of arrival of the received signal for the array of commutated antenna elements by processing the preprocessed signal to make a maximum-likelihood-estimation of the angle of arrival of the received signal; and
  (c) using a residual error associated with the maximum-likelihood-estimation of the angle of arrival of the received signal to estimate the signal-to-noise ratio of the received signal.

10. A method according to claim 9, in combination with the step of:
  (d) using the computed signal-to-noise ratio of the received signal for signal detection on a single frequency.

11. A method according to claim 9, in combination with the step of:
  (d) using the computed signal-to-noise ratio of the received signal for signal detection on multiple frequencies.

12. A method according to claim 9, wherein step (b) comprises the step of:
  (d) for a low-band type of antenna having a whip-antenna and a loop antenna as elements of the array, when the modulation of the received signal is unknown, making the maximum-likelihood-estimation of the angle of arrival $\phi$ of the received signal in accordance with the equation:

$$\phi = \operatorname{argmax}_\phi \frac{1}{1+2D^2} \|A*y\|^2$$

wherein y is a vector of the constructed estimate components of the preprocessed signal;

$$A = \begin{pmatrix} +\cos(\phi)-iD & & & & & & \\ +\sin(\phi)-iD & & & & & & \\ & +\sin(\phi)-iD & & & & & \\ & -\cos(\phi)-iD & & & & & \\ & & -\cos(\phi)-iD & & & & \\ & & -\sin(\phi)-iD & & & & \\ & & & & -\sin(\phi)-iD & \\ & & & & +\cos(\phi)-iD \end{pmatrix}$$

and

D is some unknown constant relating the gains of the whip and loop antenna elements; and wherein step (d) comprises the step of:

(f) computing the signal-to-noise ratio of the received signal in accordance with the equation:

$$\left(\frac{S}{N}\right)_{dB} = 10\log_{10} \frac{\frac{1}{1+2D^2}\|A*y\|^2}{\|y\|^2 - \frac{1}{1+2D^2}\|A*y\|^2}$$

where $$\left\{D \Big| \frac{\partial}{\partial D}\left(\frac{1}{1+2D^2}\|A*y\|^2\right) = 0\right\}$$

and $$\|y - A\tilde{z}\|^2 = \|y\|^2 - \frac{1}{1+2D^2}\|A*y\|^2$$

is said residual error associated with the maximum-likelihood-estimation of the received signal.

13. A system for estimating the signal-to-noise ratio of a signal received by an array of commutated antenna elements, wherein there is a temporal boundary at the instant of commutation between antenna elements, the system comprising:
 means for preprocessing samples of a signal received by an array of commutated antenna elements to construct estimates of the received signal for points in time that are immediately adjacent the temporal boundaries and thereby provide a preprocessed signal;
 means for estimating the angle of arrival of the received signal by processing the preprocessed signal to make a maximum-likelihood-estimation of the angle of arrival of the received signal; and
 means for using a residual error associated with the maximum-likelihood-estimation of the angle of arrival of the received signal to estimate the signal-to-noise ratio of the received signal.

14. A nontransitory computer readable storage medium for use with a computer in a system for preprocessing a signal received by an array of commutated antenna elements, wherein there is a temporal boundary at the instant of commutation between antenna elements, and wherein the computer readable storage medium includes computer executable program instructions for causing the computer to perform and/or enable the steps of:
 (a) providing samples of a signal received by an array of commutated antenna elements; and
 (b) preprocessing the provided samples of the received signal to construct estimates of the received signal for points in time that are immediately adjacent the temporal boundaries and thereby provide a preprocessed signal:
wherein step (b) comprises the step of:
 (c) making a maximum-likelihood-estimation of the received signal for points in time that are immediately adjacent the temporal boundaries; and
wherein step (c) comprises the step of:
 (d) for an AM received signal, making the maximum-likelihood-estimations x(0) using samples of the received signal that are on at least one side of the temporal boundary;
wherein an estimate of the received signal for a point in time that is immediately adjacent the earlier side of the boundary is made in accordance with the equation:

$$x(0)^- = \{(A^*_L A_L)^{-1} A^*_L y_L\}_0$$

wherein the subscript 0 refers to the antenna element corresponding to x(0);

$A_L$ is the upper half of A less the last M+1 rows that correspond to unusable samples;
where $$A = \begin{pmatrix} & \vdots & & \\ h(-2+4) & h(-2) & h(-2-4) \\ h(-1+4) & h(-1) & h(-1-4) \\ \ldots \quad h(+4) & h(0) & h(-4) \quad \ldots \\ h(+1+4) & h(+1) & h(+1-4) \\ h(+2+4) & h(+2) & h(+2-4) \\ & \vdots & & \end{pmatrix}$$

$$h(n) = \begin{cases} 1 & \text{if } n=0 \\ \dfrac{\sin\left(\pi\frac{n}{4}\right)}{\pi\frac{n}{4}} & \text{if } n \neq 0 \end{cases}$$

and h(m) is a discrete-time sine function with zeros for n a non-zero multiple of 4; and y is a vector of the samples of the received signal for the antenna element corresponding to x(0) taken prior to the boundary; and wherein an estimate of the received signal for a point in time that is immediately adjacent the subsequent side of the boundary is made in accordance with the equation:

$$x(0)^+ = \{(A^*_R A_R)^{-1} A^*_R y_R\}_0$$

and $A_R$ is the lower half of A less the first M+1 rows that correspond to unusable samples.

15. A nontransitory computer readable storage medium for use with a computer in a system for preprocessing a signal received by an array of commutated antenna elements, wherein there is a temporal boundary at the instant of commutation between antenna elements, and wherein the computer readable storage medium includes computer executable program instructions for causing the computer to perform and/or enable the steps of:

(a) providing samples of a signal received by an array of commutated antenna elements; and (b) preprocessing the provided samples of the received signal to construct estimates of the received signal for points in time that are immediately adjacent the temporal boundaries and thereby provide a preprocessed signal;

wherein step (b) comprises the step of:

(c) making a maximum-likelihood-estimation of the received signal for points in time that are immediately adjacent the temporal boundaries; and wherein step (d) comprises the step of:

(d) for an FM received signal, making the maximum-likelihood-estimations x(0) in accordance with the equations:

$$z = FM^{-1}(y')$$
$$\Rightarrow z_n = \text{Arg}(y'_{n+1}\overline{y'_n})$$
$$y' = \begin{pmatrix} A_L(A_L^*A_L)^{-1}A_L^+y_L \\ A_R(A_R^*A_R)^{-1}A_R^*y_R \end{pmatrix}$$

$$\begin{pmatrix} \vdots \\ z(M-3) \\ z(M-2) \\ z(M-1) \\ z(M+1) \\ z(M+2) \\ z(M+3) \\ \vdots \end{pmatrix} = A \begin{pmatrix} \vdots \\ x(-4) \\ x(0) \\ x(+4) \\ \vdots \end{pmatrix} + \begin{pmatrix} \vdots \\ v(M-3) \\ v(M-2) \\ v(M-1) \\ v(M+1) \\ v(M+2) \\ v(M+3) \\ \vdots \end{pmatrix}$$

$$\tilde{z} = A(A*A)^{-1}A*z$$
$$\overline{x(0)^{-,+}} = \text{argmin}_{x(0)^{-,+}}\|y_{L,R} - \tilde{y}_{L,R}x(0)^{-,+}\|^2$$
$$\Rightarrow \overline{x(0)^{-,+}} = <\tilde{y}_{L,R}, y_{L,R}> / <\tilde{y}_{L,R}, y_{L,R}>$$

wherein the subscript 0 refers to the antenna element corresponding to x(0);

z is obtained by digital FM discrimination of samples y of the received signal;

y' has left side and right side components that are the projection onto the column space of $A_L$, and $A_R$ of the respective components of the samples $y_L$ and $y_R$ respectively taken prior to and subsequent to the boundary;

$A_L$ is the upper half of A less the last M+1 rows that correspond to unusable samples;

where $$A = \begin{pmatrix} & \vdots & \\ h(-2+4) & h(-2) & h(-2-4) \\ h(-1+4) & h(-1) & h(-1-4) \\ \ldots \quad h(+4) & h(0) & h(-4) \quad \ldots \\ h(+1+4) & h(+1) & h(+1-4) \\ h(+2+4) & h(+2) & h(+2-4) \\ & \vdots & \end{pmatrix}$$

$$h(n) = \begin{cases} 1 & \text{if } n = 0 \\ \dfrac{\sin\left(\pi\frac{n}{4}\right)}{\pi\frac{n}{4}} & \text{if } n \neq 0 \end{cases}$$

and h(n) is a discrete-time sine function with zeros for n a non-zero multiple of 4; and $A_R$ is the lower half of A less the first M+1 rows that correspond to unusable samples.

16. A nontransitory computer readable storage medium for use with a computer in a system for preprocessing a signal received by an array of commutated antenna elements, wherein there is a temporal boundary at the instant of commutation between antenna elements, and wherein the computer readable storage medium includes computer executable program instructions for causing to computer to perform and/or enable the steps of:

(a) providing samples of a signal received by an array of commutated antenna elements; and (b) preprocessing the provided samples of the received signal to construct estimates of the received signal for points in time that are immediately adjacent the temporal boundaries and thereby provide a preprocessed signal;

wherein step (b) comprises the step of:

(c) making a maximum-likelihood-estimation of the received signal for points in time that are immediately adjacent the temporal boundaries; and wherein step (d) comprises the step of:

(d) for an AM received signal, making the maximum-likelihood-estimations x in accordance with the equation:

$$y = \begin{pmatrix} A_L \\ sA_R \end{pmatrix}x + v$$

$$\min_{z_{sx}} \left\| y - \begin{pmatrix} A_L \\ sA_R \end{pmatrix}x \right\|^2$$

wherein y is a vector of the samples of the received signal;

$A_L$ is the upper half of A less the last M+1 rows that correspond to unusable samples;

where $$A = \begin{pmatrix} & \vdots & \\ h(-2+4) & h(-2) & h(-2-4) \\ h(-1+4) & h(-1) & h(-1-4) \\ \ldots \quad h(+4) & h(0) & h(-4) \quad \ldots \\ h(+1+4) & h(+1) & h(+1-4) \\ h(+2+4) & h(+2) & h(+2-4) \\ & \vdots & \end{pmatrix}$$

$$h(n) = \begin{cases} 1 & \text{if } n = 0 \\ \dfrac{\sin\left(\pi\frac{n}{4}\right)}{\pi\frac{n}{4}} & \text{if } n \neq 0 \end{cases}$$

and h(n) is a discrete-time sine function with zeros for n a non-zero multiple of 4; and $A_R$ is the lower half of A less the first M+1 rows that correspond to unusable samples.

17. A nontransitory computer readable storage medium according to claim 16, wherein step (d) includes the step of:
(e) for any particular s, $\tilde{x}(s)=(A^*A)^{-1}A^*y$, determining $\tilde{s}$ by minimizing $\|y-A\tilde{x}(s)\|^2$.

18. A nontransitory computer readable storage medium for use with a computer in a system estimating the signal-to-noise ratio of a signal received by an array of commutated antenna elements, wherein there is a temporal boundary at the instant of commutation between antenna elements, and wherein the computer readable storage medium includes computer executable program instructions for causing the computer to perform and/or enable the steps of:
(a) preprocessing samples of a signal received by an array of commutated antenna elements to construct estimates of the received signal for points in time that are immediately adjacent the temporal boundaries and thereby provide a preprocessed signal;
(b) estimating the angle of arrival of the received signal for the array of commutated antenna elements by processing the preprocessed signal to make a maximum-likelihood-estimation of the angle of arrival of the received signal; and
(c) using a residual error associated with the maximum-likelihood-estimation of the angle of arrival of the received signal to estimate the signal-to-noise ratio of the received signal.

19. A nontransitory computer readable storage medium according to claim 18, wherein step (b) comprises the step of:
(d) for a low-band type of antenna having a whip-antenna and a loop antenna as elements of the array, when the modulation of the received signal is unknown, making the maximum-likelihood-estimation of the angle of arrival $\phi$ of the received signal in accordance with the equation:

$$\phi = \mathrm{argmax}_\psi \frac{1}{1+2D^2} \|A*y\|^2$$

wherein y is a vector of the constructed estimate components of the preprocessed signal;

$$A = \begin{pmatrix} +\cos(\phi)-iD \\ +\sin(\phi)-iD \\ & +\sin(\phi)-iD \\ & -\cos(\phi)-iD \\ & & -\cos(\phi)-iD \\ & & -\sin(\phi)-iD \\ & & & -\sin(\phi)-iD \\ & & & +\cos(\phi)-iD \end{pmatrix}$$

and

D is some unknown constant relating the gains of the whip and loop antenna elements; and wherein step (d) comprises the step of:
(f) computing the signal-to-noise ratio of the received signal in accordance with the equation:

$$\left(\frac{S}{N}\right)_{dB} = 10\log_{10} \frac{\frac{1}{1+2D^2}\|A*y\|^2}{\|y\|^2 - \frac{1}{1+2D^2}\|A*y\|^2}$$

where $$\left\{ D \middle| \frac{\partial}{\partial D}\left(\frac{1}{1+2D^2}\|A*y\|^2\right) = 0 \right\}$$

and $$\|y - A\tilde{z}\|^2 = \|y\|^2 - \frac{1}{1+2D^2}\|A*y\|^2$$

is said residual error associated with the maximum-likelihood-estimation of the received signal.

\* \* \* \* \*

UNITED STATES PATENT AND TRADEMARK OFFICE
CERTIFICATE OF CORRECTION

PATENT NO.          : 8,121,225 B1
APPLICATION NO.     : 12/214999
DATED               : February 21, 2012
INVENTOR(S)         : James Covosso Francis Page 1 of 1

It is certified that error appears in the above-identified patent and that said Letters Patent is hereby corrected as shown below:

at column 12, line 12, the equation should read -- $x(0)^+ = s\tilde{x}_0'$ --.

at column 13, line 11, the equation should read -- $\Phi = \text{argmin}\Phi \|y - Az\|2$ --.

at column 16, line 23, in the third line of the equation, "-D2" should be --+D2--.

at column 17, line 5, the equation should read --y = Az + v--.

at column 17, line 50, insert --and-- before --it--.

at column 17, line 55, "k ± 1" should be --k + 1--.

at column 26, line 51, "h(m)" should be --h(n)--.

at column 26, line 51, "sine" should be --sinc--.

at column 27, line 40, the equation should read -- $\widetilde{x(0)^{-,+}} = \text{argmin}_{x(0)^{-,+}} \|y_{L,R} - \hat{y}_{L,R} x(0)^{-,+}\|^2$ $\Rightarrow x(0)^{-,+} = <\tilde{y}_{L,R}, y_{L,R}> / <\hat{y}_{L,R}, \hat{y}_{L,R}>$ --.

at column 28, line 8, "sine" should be --sinc--.

at column 29, line 1, "sine" should be --sinc--.

Signed and Sealed this
Thirty-first Day of July, 2012

David J. Kappos
*Director of the United States Patent and Trademark Office*